Sept. 17, 1968   M. N. OSBORN   3,401,886
THRUST VECTOR CONTROL DEVICE
Filed May 12, 1966   2 Sheets-Sheet 1
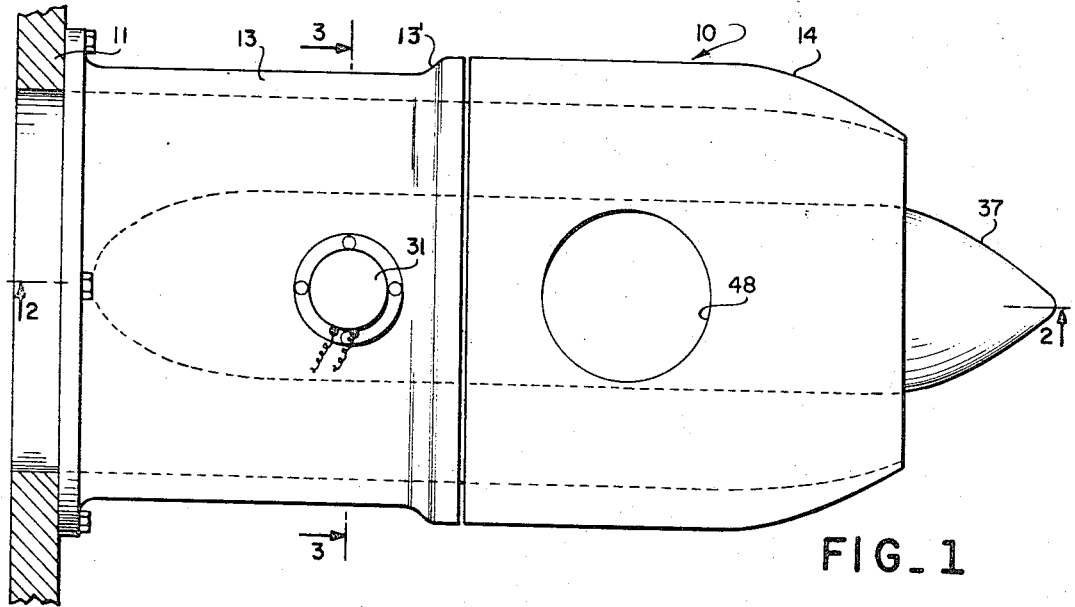
FIG_1
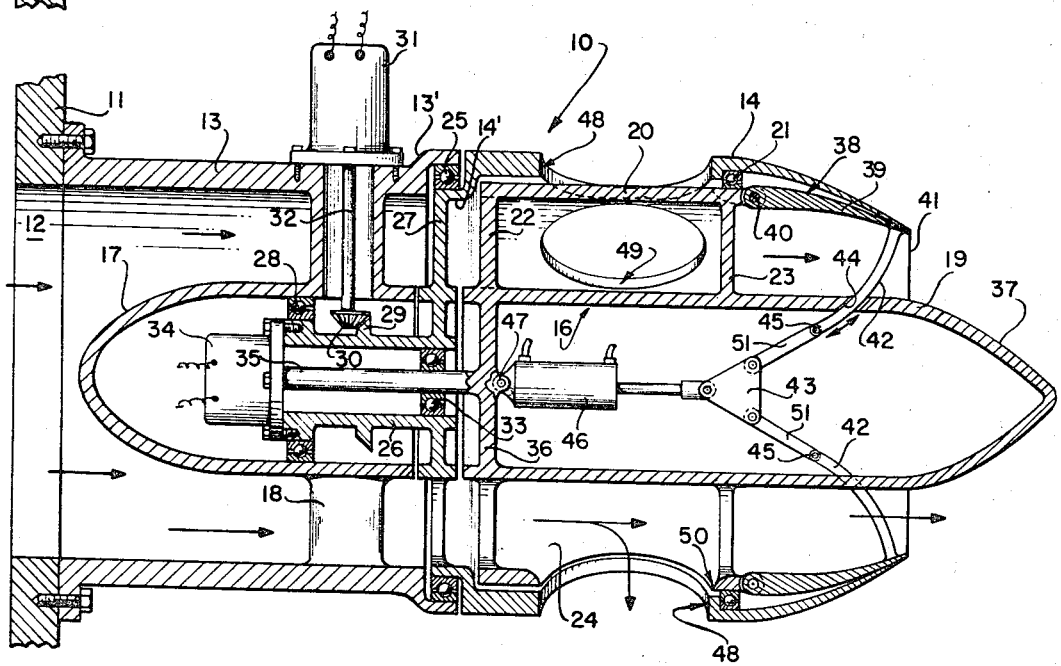
FIG_2
INVENTOR.
MELVIN N. OSBORN
BY
Agent

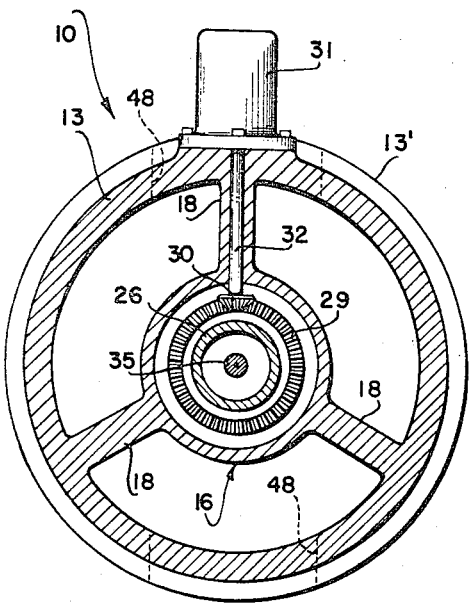
FIG_3
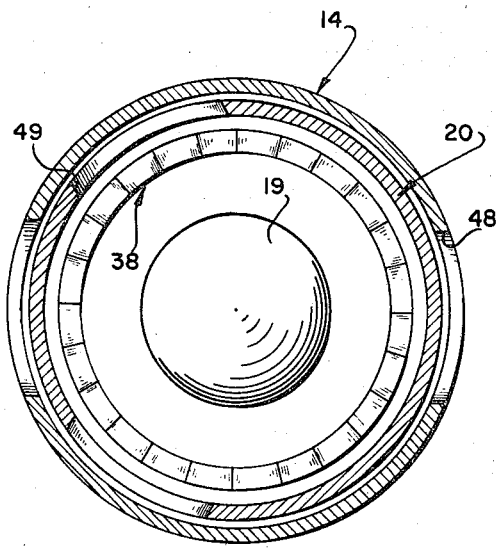
FIG_4
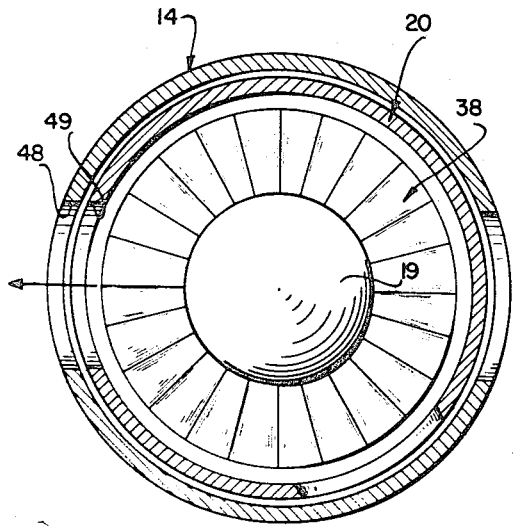
FIG_5
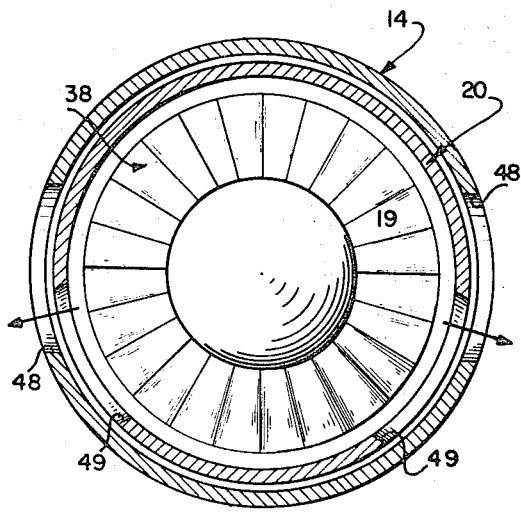
FIG_6

3,401,886
THRUST VECTOR CONTROL DEVICE
Melvin N. Osborn, Marietta, Ga., assignor to Lockheed Aircraft Corporation, Burbank, Calif.
Filed May 12, 1966, Ser. No. 549,540
8 Claims. (Cl. 239—265.25)

This invention relates generally to control devices for fluid flow and more particularly to such a device capable of directing a jet stream for the purpose of controlling the effective thrust vector thereof and which has particular utility in controlling the attitude and flight direction of aircraft capable of vertical take-off and landing (VTOL).

In VTOL aircraft conventional control surfaces are ineffective for directional control and stability during the hover, vertical, and low-speed flight regimes due to the absence of sufficient dynamic pressures. Thus, it has been heretofore proposed to employ jet streams from gas generating type engines and the like, strategically located with reference to the roll, pitch, and yaw axes of the aircraft, together with means to cause the differential discharge thereof to produce an effective resultant thrust vector, the reaction of which forcibly moves the aircraft on and about such axis. It is this last-mentioned means to which the present invention is directed inasmuch as devices presently available for this purpose leave much to be desired especially from the standpoint of efficiency and reliability.

To be operative, the discharge outlet of a jet engine must be matched at all times to the operation of the engine. This requires not only reliable means controlling the effective outlet area during transition from one thrust direction to another, but also, to be effective, means for the adjustment of such area corresponding to different engine requirements. At the same time, in order to satisfy flight control and stability of the aircraft at all times, it is desirable that the thrust direction be completely adjustable, i.e., the thrust vector moved to substantially any radial direction without noticeable pressure losses or lag time.

The present invention proposes to meet the above and other requirements by the provision of a fluid control device which, when operatively installed in a jet stream, permits the radial adjustment of the discharge direction thereof through a full three hundred sixty degrees (360°). The design and construction of this device is such that the effective area of its discharge outlet can be readily held constant so as to conform to the operation of the engine and thereby avoid the need for complex timing and synchronizing mechanisms. Nevertheless, this effective area may be adjusted and, throughout this adjustment as well as the thrust direction adjustment, there is essentially no lag time.

More specifically, the control device herein contemplated comprises a pair of substantially coextensive sleeves to define the exhaust duct for the jet stream. The side walls of each of these sleeves are pierced by openings, and closure means is provided adjacent the aft ends of the sleeves, together with actuator means for the operation thereof to open and close such ends whereby the jet stream is exhausted laterally of the sleeves through the side openings therein.

An individual drive is associated with each of the sleeves for the independent axial rotation thereof whereby the relative positions of their side wall openings may be adjusted. In addition, the drive associated with the inner sleeve is carried by the outer sleeve for rotation in unison therewith. Thus, rotation of the inner and outer sleeves as a unit serves to establish and control the direction of the lateral jets over a complete three hundred sixty degree (360°) range while rotation of the inner sleeve relative to the outer sleeve serves to control the size, and therefore the force or pressure, of the lateral jets. In short, the individual operation of the sleeves permits adjustment of the direction and magnitude of lateral thrusts independently of each other. This avoids the requirement for coordination of operation of the sleeves and complex mechanisms essential to such operation.

With the above and other objects in view as will be apparent, this invention consists in the construction, combination and arrangement of parts all as hereinafter more fully described, claimed and illustrated in the accompanying drawings, wherein:

FIGURE 1 is a side elevation of a thrust vector control device constructed in accordance with the teachings hereof to show the general assembly thereof and its mounting to associated structure only a fragment of which is illustrated;

FIGURE 2 is a longitudinal section taken along line 2—2 of FIGURE 1 to show primarily the sleeves and the individual rotary drives therefor as well as the interconnection means between such sleeves for their rotation in unison;

FIGURE 3 is a transverse section taken along line 3—3 of FIGURE 1 to show primarily the exhaust duct or passage through the device and the mounting of the drive for rotation of the sleeves in unison;

FIGURE 4 is a composite view thereof showing the aft ends of the sleeves open and a section through the sleeves showing the side openings closed for an exhaust discharge in the axial direction only;

FIGURE 5 is a similar view showing the ends of the sleeves and one side opening closed for an exhaust discharge in a lateral, asymmetric direction; and FIGURE 6 is a similar view showing the ends of the sleeves closed and the side openings partially open for an exhaust discharge in a lateral, symmetric direction.

Referring more particularly to the drawings, 10 designates a thrust vector control device constructed in accordance with the teachings hereof. This device 10 is adapted to be secured to fixed structure 11 defining an exhaust outlet 12 from a jet engine or similar thrust producing source (not shown) and comprises a fixed forward section 13 and a rotatable aft section 14 through which the jet stream leaving the exhaust outlet 12 is adapted to flow.

Coaxially mounted within the device 10 is a streamline housing 16, the forward or upstream portion 17 of which is secured to the fixed forward section 13 through an integral spider 18, and the downstream or aft portion 19 of which forms an integral part of a sleeve or drum 20 rotatably mounted, as at 21, within the aft section 14 being connected thereto through spiders 22 and 23. An annular passage or exhaust outlet 24 is thereby produced constituting an extension on the exhaust outlet 12.

The adjacent ends of the forward section 13 and aft section 14 are each formed or otherwise provided with offset necks 13' and 14' respectively, which are designed and adapted to overlap and rotatably interconnect in conventional manner through antifriction means such as a roller bearing 25. The neck 14' of aft section 14 forms an integral part of a tubular hub 26 to which it is connected through a spider 27. The hub 26 extends from the aft section 14 toward forward section 13 to be disposed within housing portion 17 to which it is rotatably secured, as at 28. Medially, the hub 26 carries a peripheral gear 29 in constant engagement or mesh with a drive gear 30 operatively connected to a motor 31. This motor 31 is mounted to the stationary section 13 in any conventional manner adjacent one of the legs of the spider 18 which is hollow to permit the passage of a drive shaft 32 connecting the gear 30 to the motor 31.

The aft portion 19 of housing 16 and the drum 20 are rotatably connected, as at 33, to the aft section 14 through a motor 34 and a drive shaft 35 therefrom. The motor 34 is secured to the hub 26 by appropriate means with the shaft 35 extending through the center of the hub 26 and connected to a wall 36 closing the adjacent end of the aft housing portion 19. Thus, while the drum 20 and aft housing portion 19 are carried by and rotatable with the aft section 14, they are also capable of independent rotation as a unit relative thereto.

The aft extremity of the housing 16 extends beyond the drum 20 and aft section 14 tapering, as at 37, substantially to a point. The aft section of the drum 20 terminates in an iris diaphragm 38 formed by multiple radially overlapped segments or leaves 39 all connected to the drum 20 at a common hinge or pivot point 40. The transverse area 41 of the iris 38 is thereby made variable by the rotation of the several leaves 39 on their common pivot 40 following known practice.

The outer end of each leaf 39 is connected to one end of a rib 42 the other end of which is pivotally connected to a mount 43 common to all such ribs 42 located at the longitudinal center of the housing 16. The wall of the housing 16 is pierced by an opening 44 to permit the passage of each rib 42 therethrough. Each rib 42 is hinged, as at 45, medially of its length to permit the linear movement of mount 43 while the leaves 39 are being rotated thereby without interference of the ribs 42 with the wall of the housing 16 defining the associated openings 44. Such movement of the mount 43 is effected by suitable actuator means 46 mounted, as at 47, within the housing 16.

The peripheral wall of the aft section 14 is pierced by diametrically opposed openings or ports 48 and the underlying wall of drum 20 is pierced by a pair of identical ports 49 and 50 asymmetrically arranged. The ports 48 in aft section 14 and the ports 49 and 50 in drum 20 are disposed at all times in a common transverse plane. However, the relative location of ports 49 and 50 is such that upon rotation of aft section 14 or drum 20 in either direction one or the other of ports 49 or 50 overlaps and eventually aligns concentrically with one of the ports 48, i.e., it opens while the other port 49 or 50 disaligns with the other port 48 and is thus closed by the wall of the aft section 14. Upon continued rotation of the aft section 14 or drum 20 in the same direction, the open port 49 or 50 begins to close while the closed port 49 or 50 concurrently and equally opens until eventually the situation has completely reversed.

Due to the foregoing construction and arrangement of parts, the operation of the motors 31 and 34 can produce a symmetrical radial discharge or an asymmetrical, i.e., an imbalanced discharge, to any desired degree and in any radial direction. By adjustment of the area 41 through operation of the iris 38, the effective discharge area is maintained uniform during an asymmetric thrust increase without causing back pressures. This adjustment also permits a finer degree of thrust control in both the axial and radial directions.

It should be understood that the above disclosure is specifically directed to a preferred embodiment of the invention. Numerous modifications will suggest themselves to those skilled in the art without departing from the true spirit and scope of the invention as stated initially hereinabove and set forth with particularity in the appended claims which alone define the limitations of the invention.

What is claimed is:

1. A thrust vector control device comprising a pair of substantially coextensive sleeves adapted to be disposed in and define a jet stream, ports located in a common transverse plane in the wall of each of said sleeves, a rotary drive individual to each of said sleeves for the independent rotation thereof whereby the relative positions of said ports are adjusted, the drive of one of said sleeves being carried by the other sleeve for rotation in unison therewith, and a movable closure adjacent the aft end of said sleeves.

2. The device of claim 1 wherein said closure is radially adjustable to vary the transverse area of the passage defined thereby.

3. The device of claim 1 wherein the drive of said one sleeve is disposed on the longitudinal center line of said sleeves and including a streamline housing enclosing said drive.

4. The device of claim 1 wherein the outer sleeve is rotatably mounted on fixed structure and the inner sleeve is rotatably mounted in said outer sleeve.

5. The device of claim 1 wherein the ports in one of said sleeves are diametrically opposed and the ports in the other of said sleeves are asymmetrically located.

6. The device of claim 1 including a stationary mount connecting said sleeves to fixed structure defining an exhaust outlet from a jet engine.

7. The device of claim 6 wherein the drive of the other of said sleeves is carried by said mount.

8. The device of claim 1 wherein said sleeves are rotatably mounted on and disposed contiguous with fixed structure defining an exhaust outlet from a jet engine, the drive of said one sleeve is disposed centrally within said sleeves, and said closure is an iris diaphragm operable between said drive and the adjacent sleeve surface.

References Cited

UNITED STATES PATENTS

| | | | |
|---|---|---|---|
| 2,840,324 | 6/1958 | Smith | 244—52 |
| 2,974,899 | 3/1961 | Fowler | 244—52 |
| 3,190,584 | 6/1965 | Gire et al. | 244—52 |

EVERETT W. KIRBY, *Primary Examiner.*